May 5, 1970    J. R. SETINA    3,510,164
AUTOMOBILE PARTITION APPARATUS PIVOTED ON GUARDPLATE
Filed Sept. 11, 1968    3 Sheets-Sheet 1

JOHN R. SETINA
*INVENTOR*

BY
BUCKHORN, BLORE, KLARQUIST & SPARKMAN
ATTORNEYS

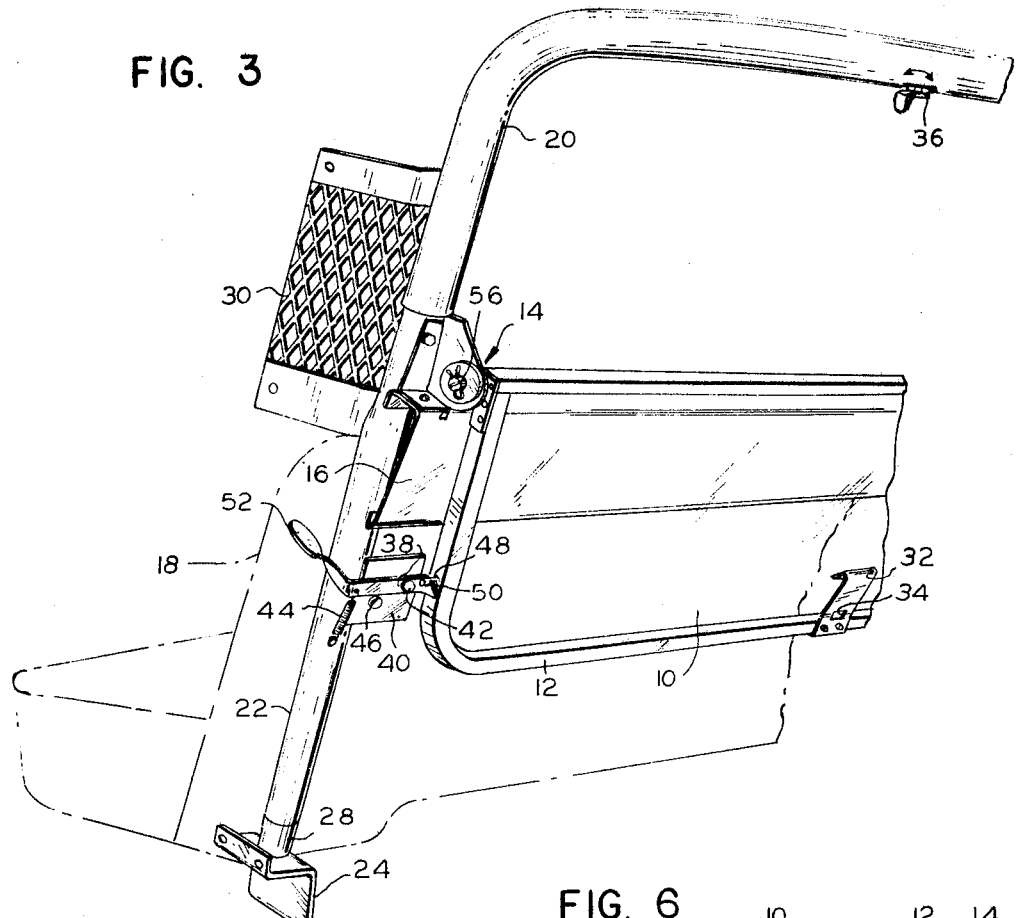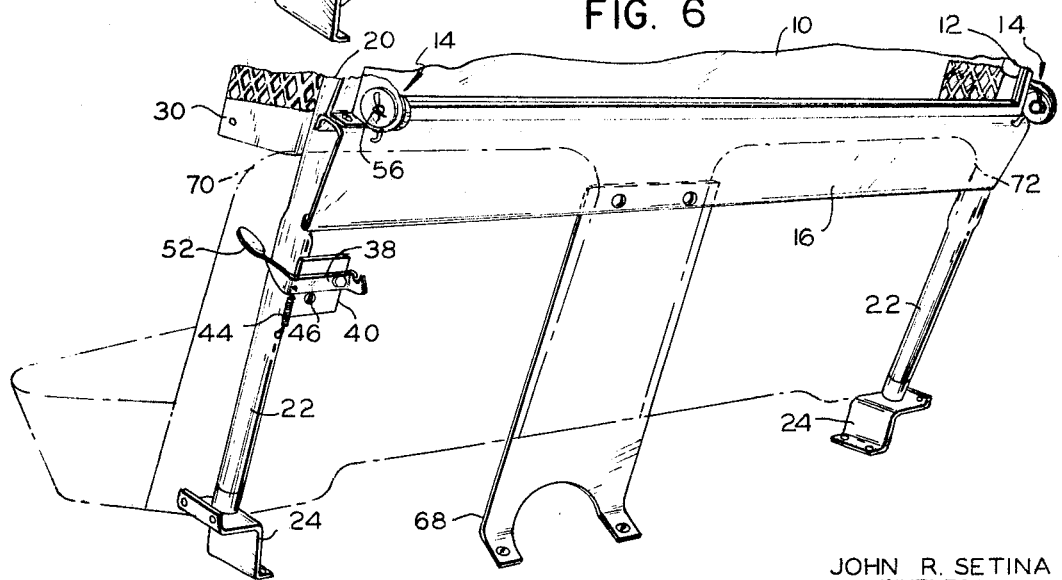

May 5, 1970   J. R. SETINA   3,510,164
AUTOMOBILE PARTITION APPARATUS PIVOTED ON GUARDPLATE
Filed Sept. 11, 1968   3 Sheets-Sheet 3

JOHN R. SETINA
INVENTOR
BY
BUCKHORN, BLORE, KLARQUIST & SPARKMAN
ATTORNEYS

United States Patent Office 3,510,164
Patented May 5, 1970

3,510,164
AUTOMOBILE PARTITION APPARATUS
PIVOTED ON GUARDPLATE
John R. Setina, Rte. 5, Box 522, Olympia, Wash. 98501
Filed Sept. 11, 1968, Ser. No. 758,947
Int. Cl. B62d 33/04
U.S. Cl. 296—24                     10 Claims

ABSTRACT OF THE DISCLOSURE

An automobile partition apparatus for shielding the front seat area is described in which the partition is pivotally mounted on a guardplate member secured between the leg portions of a roll bar and extending across the width of the automobile along the rear of the front seat backrest. The partition apparatus includes a spring biased pivot mechanism which, when a latch is released, automatically pivots the partition from a lowered position behind the backrest to a raised position between the top of such backrest and the roof of the automobile. The guardplate member extends downward substantially parallel to the front seat backrest a sufficient distance to enable the partition apparatus to be employed in automobiles of different seat backrest heights and allows back and forth seat adjustments while still protecting the driver of a police car, taxicab or other vehicle from passengers riding in the rear seat.

BACKGROUND OF THE INVENTION

The subject matter of the present invention relates generally to partition apparatus for passenger vehicles and in particular to an automobile partition apparatus including a pivoted partition which in its raised position fills the space between the top of the front seat backrest and the roof of the automobile to divide such automobile into separate front and rear seat compartments. The partition is pivotally mounted on or adjacent to a guardplate extending across the width of the automobile parallel to the rear of the front seat backrest.

The partition apparatus of the present invention is especially useful in police cars to protect the driver from prisoners in the back seat. However, the partition apparatus may also be used in taxicabs or in conventional automobiles including sedans and station wagons, as well as trucks or other vehicles including airplanes.

The automobile partition of the present invention is an improvement over previous partitions such as that shown in U.S. Pat. No. 2,884,279 which employs a complicated mounting mechanism including a plurality of lever arms to move the partition between its raised and lowered positions while maintaining such partition vertical. In addition to its simpler and less expensive construction, the present partition apparatus also has an easier and more trouble free operation. Another advantage of the present invention over that of the above-mentioned partition apparatus is that it is more versatile and can be employed with seats having backrests of different heights, or those employing headrests attached to the top of the seat backrest.

The partition apparatus of the present invention may be supported between the legs of a roll bar so that such roll bar forms part of the apparatus and provides a stronger, safer automobile, as shown in my earlier Pat. No. 3,214,211. The present partition apparatus is simpler and more compact so it does not appreciably reduce the leg room of the rear seat passengers. It also employs a spring biased pivot mechanism which enables a driver to raise the partition with one hand merely by releasing a latch from either the front or back seat. This is especially convenient in a police car when the driver is forcing a prisoner into the rear seat of the automobile at gun point, so that only one hand is free to raise the partition apparatus.

It is therefore one object of the present invention to provide an improved partition apparatus for a passenger vehicle which is of simple, inexpensive construction and operates in an easy, trouble-free manner.

Another object of the invention is to provide an improved automobile partition apparatus which is strong and safe, and does not obstruct the visibility for the driver.

A further object of the invention is to provide an improved automobile partition which is compact and may be pivoted to a lowered position behind the front seat backrest, where it may be stored without appreciably restricting the leg room of the rear seat passengers.

An additional object of the invention is to provide an improved automobile partition apparatus which is versatile and can be employed with different types of automobiles including those having front seat backrests of different height.

BRIEF DESCRIPTION OF THE DRAWINGS

Other objects and advantages of the present invention will be apparent from the following description of certain preferred embodiments thereof and from the attached drawings of which:

FIG. 3 is a perspective view of a portion of the partition apparatus of FIG. 1 with such partition shown in its lowered position;

FIG. 6 is a perspective view of the partition apparatus similar to that of FIG. 1 but employing another type of guardplate which may be used when the front seat is divided into two separate seats.

DESCRIPTION OF PREFERRED EMBODIMENTS

Figure 1:
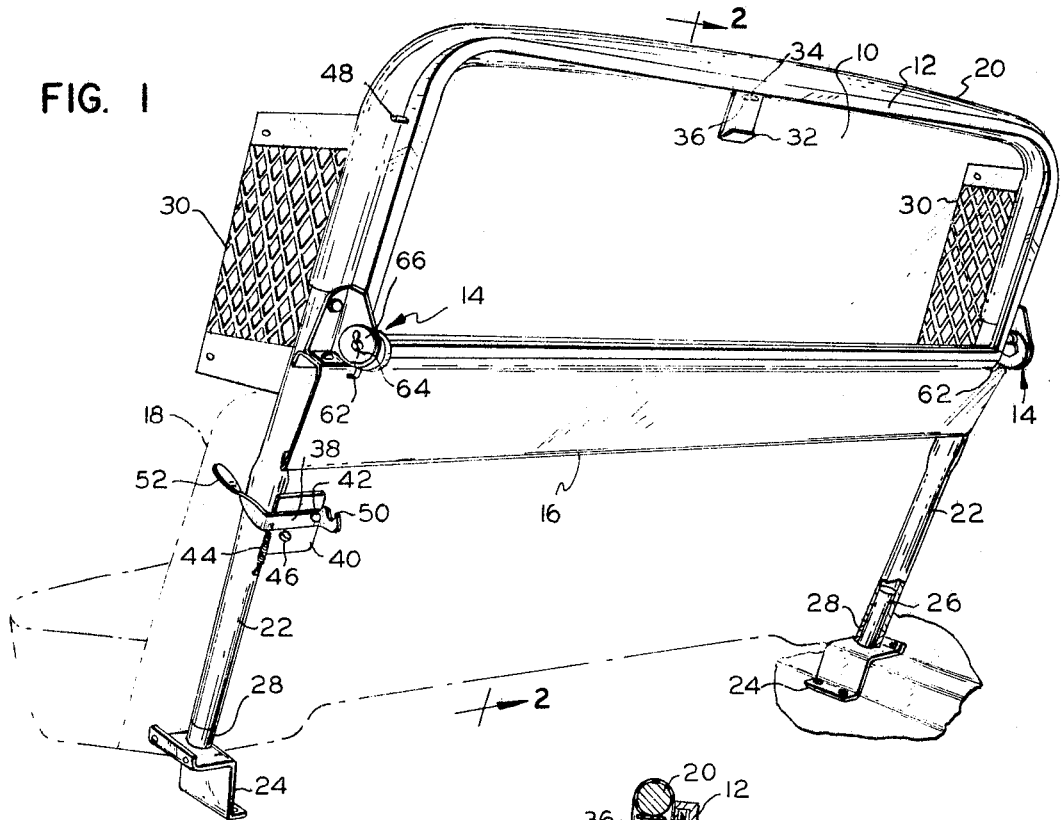
FIG. 1 is a perspective view of the partition apparatus of the present invention installed adjacent the rear of the front seat backrest of an automobile and shown in its raised position.
Figure 2:
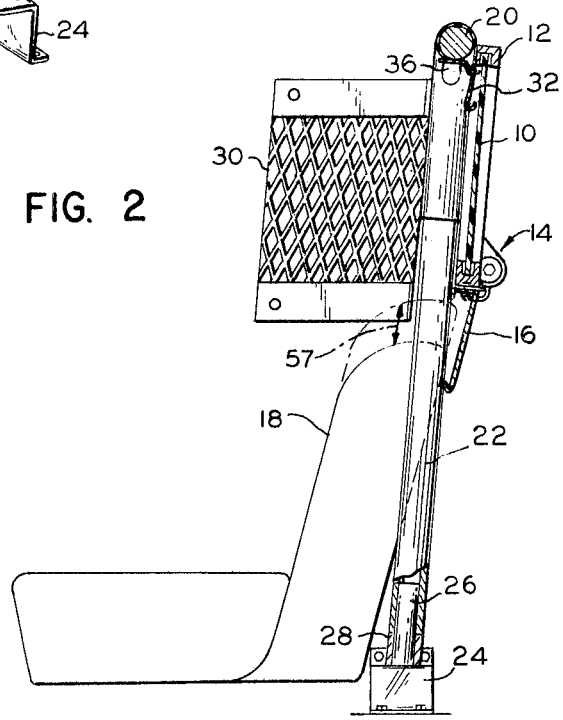
FIG. 2 is a vertical section view taken along the line 2—2 of FIG. 1.

As shown in FIGS. 1 and 2, one embodiment of the partition apparatus of the present invention includes a partition window 10 of light transparent, substantially unbreakable construction which is mounted within a metal frame 12 of aluminum or other strong, light weight material. The partition window 10 may be in the form of a sheet of transparent plastic such as methyl methacrylate sold under the trade name "Plexiglas," or it may be a wire mesh or even a thick, laminated bullet-proof safety glass. The partition is pivotally mounted on a metal guardplate member 16 by a pair of pivot mechanisms 14 hereafter described in greater detail, at the opposite ends of the bottom portion of its frame 12. The guardplate member 16 extends across the width of the automobile adjacent the rear of the front seat backrest 18.

While the guardplate 16 may be attached to the automobile by brackets on the door posts, it is preferable to employ a roll bar 20 for this purpose. Thus the oppoosite ends of the guardplate 16 are welded to the leg portions 22 of the roll bar intermediate the ends of such leg portions. The roll bar 20 is attached to the floor of the automobile by mounting brackets 24, having an upwardly extending tubular projection 26 which fits into the hollow leg portions 22 of the roll bar. In addition, spacer sleeves 28 may be provided on the projections 26 in order to space the ends of the roll bar leg portions 22 the proper distance from the floor to position the top of the roll bar adjacent the roof of the automobile. These spacer sleeves enable the same roll bar to be used with automobiles having different roof heights. In addition, side brackets 30 of expanded metal mesh are secured in the space between the upper ends of the roll bar leg portions 22 and the sides of the automobile for additional support and to prevent a rear seat passenger from reaching through such space.

The partition is held in the raised position shown in FIGS. 1 and 2 by a lock mechanism including a lock plate 32 attached to the top of the partition frame 10 on the front seat side of such partition and having an opening 34 which is engaged by a spring biased lock member 36 pivotally mounted on the under side of the top portion of the roll bar as is more clearly shown in FIG. 3. After it is inserted into the hole 34 the lock member 36 is pivoted horizontally by its bias spring to engage the lock plate 32 and hold the partition in the raised position. It should be noted that the lock is released manually by rotating the lock member 36 horizontally and pushing the partition back until such lock member passes out of the hole in the lock plate 32. Then the partition apparatus may be pivoted down into the lowered position shown in FIG. 3, where such partition is stored behind the front seat backrest.

A latch mechanism including a spring biased latch member 38 is employed to hold the partition in the lowered position shown in FIG. 3. The latch member 38 is pivotally mounted on a pivot bolt 42 secured through a hole in a support bracket 40 welded to the leg portion 22 of the roll bar adjacent the driver's seat. A coil spring 44 having one end attached to the latch member 38 and its other end attached to the roll bar leg portion 22, normally urges such latch member in a counterclockwise direction against a stop bolt 46 secured to the bracket 40. A latch pin 48 secured to the side portion of the partition frame 12 engages a hook 50 on the end of the latch member 38 in the lowered position of the partition. The latch member 38 is provided with a handle portion 52 which, when pulled up, rotates such latch member clockwise and releases the latch pin 48. This enables the partition to be automatically pivoted upward from the lowered position shown in FIG. 3 to the raised position shown in FIG. 1 by the two spring biased pivot mechanisms 14.

Figure 4:
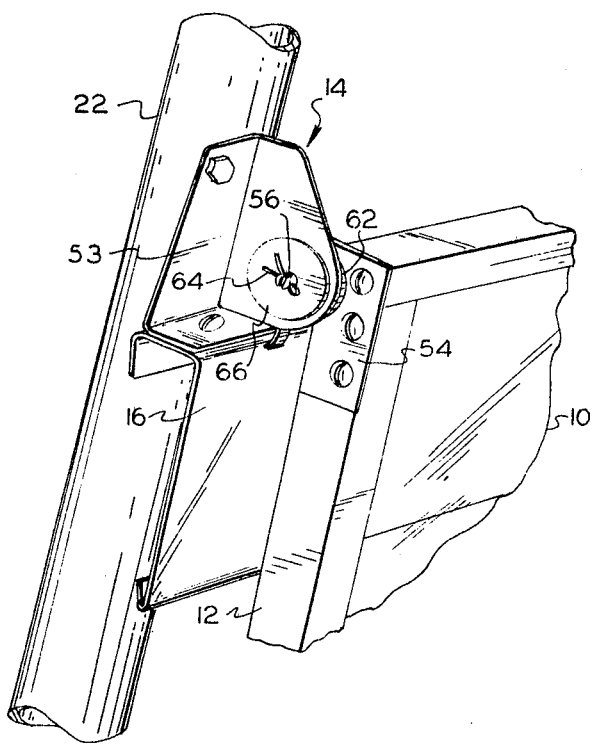
FIG. 4 is a view of a portion of the apparatus of FIG. 1, showing on an enlarged scale the pivot mechanism employed to connect the partition to the guard plate and roll bar.
Figure 5:
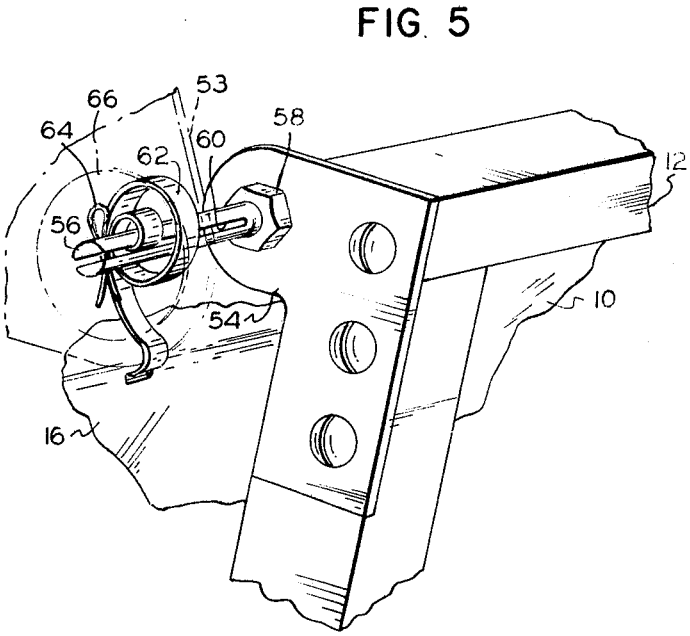
FIG. 5 is an enlarged view of a portion of FIG. 4 with parts broken away for clarity.

The pivot mechanism 14 is shown in greater detail in FIGS. 4 and 5 and includes a first pivot member 53 bolted to the top edge of the guardplate 16 which has an inverted L-shaped cross section, and also bolted to the leg portion 22 of the roll bar. A second pivot member 54 is secured to the side of the partition frame 12 adjacent the bottom of such frame. A pivot pin 56 fixedly attached by nuts 58 to the second pivot member 54 on the partition frame is inserted through a hole in the first pivot member 53 attached to the guardplate 16 and secured thereto to enable the partition to pivot between the raised and lowered positions. The pivot pin 56 is provided within a notch 60 into which one end of a coil spring 62 is inserted. The coil spring 62 is wrapped about the pivot pin 56 and has its other end fixedly secured to the guardplate 16. The spring 62 rotates the pivot pin 56 and the partition in a counterclockwise direction in FIG. 4 so as to cause the partition to automatically rotate from its lowered position to its upper position when the latch 38 is released. A cotter pin 64 may be provided through the free end of the pivot pin 56 to hold a washer 66 on such pivot pin and enable easier rotation. Of course other spring raising mechanisms can be employed, but that shown in FIGS. 4 and 5 has the advantage of being extremely compact.

It should be noted that the pivot axis of the pivot pin 56 is displaced beyond the rear surface of the guardplate 16 to enable the partition to clear such guard plate in the lowered position behind the front seat of the automobile to enable the partition to be held closely adjacent the rear surface of the front seat backrest so as not to reduce the leg room in the rear seat. As shown in FIG. 2 the angle of the rear portion of the guardplate with respect to the roll bar leg portions 22 is such that when installed guardplate extends substantially parallel to the rear of the front seat backrest. This enables the height of the backrest to vary as indicated by arrows 57, as is true with seats of different model automobiles and seats of adjustable height, or those in which a headrest is provided on top of the backrest. The lower edge of the guardplate 16 extends downward below the top edge of the front seat backrest a sufficient distance to prevent a passenger in the rear seat of the automobile from reaching under such guardplate into the front seat of the automobile even when such front seat is adjusted as far forward and as far down as possible. Thus the guard plate 16 also enables different back and forth as well as up and down adjustments of the front seat to accommodate drivers of different height, etc.

As shown in FIG. 6, another embodiment of the guardplate means for the partition apparatus of the present invention includes a filler plate 68 bolted between the floor and the bottom edge of the guardplate 16 intermediate its ends. This filter plate 68 is employed when the front seat is divided into two separate front seats of the bucket type, so that backrests 70 and 72 of such seats are separated by a space which must be closed by the filler plate to prevent a rear seat passenger from reaching between the front seat backrests. Of course it is also possible that the guardplate member 16 may be merely made wider and extended to the bottom ends of the leg portions 22 of the roll bar, in which case no such separate filler plate would be required.

Many changes in the above-described preferred embodiments of the present invention may be made by those having ordinary skill in the art, without departing from the spirit of the invention. For example, the pivot 14 may be attached solely to the roll bar or to a side bracket separate from the guardplate, as long as it pivots the partition adjacent the top of such guardplate. Therefore the scope of the invention should only be determined by the following claims.

I claim:
1. Automobile partition apparatus, comprising:
   a light transparent partition of substantially unbreakable construction;
   a guardplate means;
   support means for attaching the guardplate means to the automobile so that said guardplate means extends across the entire width of the automobile adjacent the top of the front seat backrest and extends at least partially down said backrest; and
   pivot means for pivotally mounting said partition adjacent the top of said guardplate means to enable pivoting of the partition between a raised position in which the partition extends upward contiguously from the guardplate means to the roof of the automobile and lowered position in which the partition extends downward from the guardplate means behind said backrest.

2. Partition apparatus in accordance with claim 1 in which the partition includes a frame having a bottom portion which is pivotally attached directly to said guardplate means.

3. Partition apparatus in accordance with claim 1 in which the supporting means includes a roll bar having a pair of leg portions and a top portion extending between the upper ends of said leg portions, and the guardplate member is attached between said leg portions intermediate their upper and lower ends.

4. Partition apparatus in accordance with claim 3 which also includes lock means for locking said partition to said roll bar in said raised position and latch means for latching the partition to the roll bar in said lowered position.

5. Partition apparatus in accordance with claim 4 which also includes spring means for automatically pivoting said partition from said lowered position to said raised position when said latch means is released.

6. Partition apparatus in accordance with claim 5 in which the pivot means includes a first bracket member attached to the bottom of the partition, a second bracket member attached to the guardplate means and a pivot pin fixedly attached to said first bracket member and extending through a hole in said second bracket member, and the spring means is a coil spring having one end fixedly secured to the guardplate means and its other end inserted in a slot provided in said pivot pin to rotate said pivot pin to cause partition to pivot into said raised position.

7. Partition apparatus in accordance with claim 5 in which the latch means includes a spring biased latch member pivotally mounted on the leg portion of the roll bar adjacent the driver's seat and a latch pin attached to the partition frame.

8. Partition apparatus in accordance with claim 1 in which the guardplate means includes a back portion which extends substantially parallel to the back surface of the front seat backrest, 9. Partition apparatus in accordance with claim 8 in which the front seat is divided into two separate seats and the guardplate means also includes a filler plate portion extending to the floor of the automobile in position to fill the space between the two backrests of the front seats.

10. Partition apparatus in accordance with claim 3 which also includes a pair of mounting means for attaching the lower ends of the leg portions of the roll bar to the floor of the automobile, and leg portions being tubular and said mounting means each including a projection portion which extends into said tubular leg portion and a spacer sleeve surrounding said projection portion.

References Cited

UNITED STATES PATENTS

| | | | |
|---|---|---|---|
| 2,884,279 | 4/1959 | Halstead et al. | 296—24 |
| 3,190,686 | 6/1965 | Smiler | 296—24 |

BENJAMIN HERSH, Primary Examiner

R. R. SONG, Assistant Examiner

U.S. Cl. X.R.

280—150